United States Patent [19]

Wilkins

[11] E Patent Number: Re. 33,311

[45] Reissued Date of Patent: Aug. 28, 1990

[54] BINOCULAR EYEGLASSES FOR IMAGE MAGNIFICATION

[76] Inventor: Vaughn D. Wilkins, 19163 Olympia St., Northridge, Calif. 91326

[21] Appl. No.: 155,474

[22] Filed: Feb. 12, 1988

Related U.S. Patent Documents

Reissue of:

[64] Patent No.: 4,637,696
Issued: Jan. 20, 1987
Appl. No.: 809,495
Filed: Dec. 16, 1985

[51] Int. Cl.[5] ..... G02C 7/08; G02C 1/00

[52] U.S. Cl. ..... 351/41; 351/57; 351/158

[58] Field of Search ..... 350/420, 145, 146, 433; 351/41, 57, 58, 158

[56] References Cited

U.S. PATENT DOCUMENTS

| | | | |
|---|---|---|---|
| 1,086,802 | 2/1914 | Beebe | 350/146 |
| 2,172,959 | 9/1939 | Hirtenstein | 351/119 |
| 2,978,955 | 4/1961 | Frommer | 351/57 |
| 4,155,626 | 5/1979 | Grech | 351/41 |
| 4,195,918 | 4/1980 | Freche et al. | 351/158 |

*Primary Examiner*—Rodney B. Bovernick

*Attorney, Agent, or Firm*—Kelley, Bauersfeld & Lowry

[57] ABSTRACT

Binocular eyeglasses are provided for magnification of images, for example, when viewing television or when viewing distant images, such as a sporting event or the like. The binocular eyeglasses comprise a lightweight frame assembly including a lens carrying front frame with rearwardly extending bows permitting the eyeglasses to be worn in a normal manner. The front frame includes eyepiece lenses supported in stationary positions in front of the viewer's eyes and a respective pair of relatively wide-angle and relatively low-power objective lenses movable quickly and easily between close-range and long-range focus setting positions.

12 Claims, 3 Drawing Sheets

BINOCULAR EYEGLASSES FOR IMAGE MAGNIFICATION

Matter enclosed in heavy brackets [ ] appears in the original patent but forms no part of this reissue specification; matter printed in italics indicates the additions made by reissue.

BACKGROUND OF THE INVENTION

This invention relates generally to optical devices for magnifying or enlarging viewed images. More particularly, this invention relates to a relatively lightweight and inexpensive pair of binocular eyeglasses which can be worn comfortably and adjusted easily for use in magnifying observed images, for example, while watching television or observing sporting events or the like.

Optical devices such as telescopes, binoculars, and the like are relatively well known in the art for use in magnifying or enlarging observed images. Such optical devices conventionally include eyepiece and objective lenses mounted within an elongated tubular housing in spaced relation along an optical axis. Adjustment means is normally provided to vary the spacing between the eyepiece and objective lenses to select the range at which images can be viewed in relatively sharp focus.

While prior art binoculars and telescope devices accommodate viewing of images at relatively long-range distances, their use can be cumbersome or inconvenient in some situations. For example, binoculars are commonly used by spectators during sporting events, theatrical or operative productions, and the like to afford a better or close-up view of the event. However, the binoculars tend to be relatively heavy and bulky and are not adapted for direct mounting and wearing upon the viewer's head but instead must be held manually in front of the viewer's eyes. As a result, the viewer tends to observe the event through the binoculars at intermittent intervals and not for any sustained period of time. Moreover, the requirement to look through the tubular housing structure can be distracting to some viewers, resulting in a tendency to avoid use of the binoculars for purposes of avoiding eye fatigue.

In addition, traditional binoculars and/or telescope devices have not been adapted in a convenient and relatively inexpensive form for viewing relatively close-range images, for example, while watching television or the like. However, magnification of television images for easier viewing can be extremely beneficial when the television is relatively small or when the viewer is located at a significant distance from the television. Moreover, magnification of television images can be beneficial to persons having certain vision deficiencies, such as myopia.

Accordingly, the object of the present invention is to provide a relatively simple and relatively inexpensive optical device in the form of binocular eyeglasses which can be worn comfortably and over a prolonged time period, and which includes optical elements for magnification of observed images.

SUMMARY OF THE INVENTION

In accordance with the invention, a relatively lightweight pair of binocular eyeglasses is provided for magnification or enlargement of observed images, for example, while watching television or a sporting event or the like. The binocular eyeglasses include optical elements supported upon a relatively simple frame assembly which can be worn in a comfortable manner over an extended time period. The optical elements are adjustable between preset limits for respectively viewing relatively close-range or long-range images in clear focus.

In the preferred form of the invention, the frame assembly for the binocular eyeglasses includes a front frame with a rear panel supporting a pair of eyepiece lenses. The rear panel is joined at its opposite ends to a pair of forwardly projecting side panels to which a pair of adjustable bows are connected to extend rearwardly over the ears of the person wearing the eyeglasses, thereby supporting the eyepiece lenses in fixed positions in front of the viewer's eyes. A front slide panel is carried along a track between the side panels and includes a pair of objective lenses positioned in respective optical alignment with the eyepiece lenses. These objective lenses are selected to have relatively wide angle and relatively low power magnification characteristics.

The eyeglasses include adjustment means including front and rear limit stops defining end limits of fore-aft movement for the front slide panel and objective lenses. More particularly, the front slide panel can be moved forwardly between the frame side panels to contact the front limit stops thereby achieving a close-range focus setting position for clear viewing of images within a relatively close range, such as about six feet to about twenty feet. Alternatively, the slide panel can be displaced rearwardly into contact with the rear limit stops for focusing of relatively long-range images, such as images located at distances greater than about twenty feet. Guide runners on the side panels conveniently cooperate with the front slide panel to maintain optical alignment between the eyepiece and objective lenses. Lock means are provided for securing the slide panel in the selected position of adjustment.

In accordance with further features of the invention, the front frame includes a plurality of forwardly projecting spacer tabs for preventing surface scratching of the objective lenses when the eyeglasses are placed, for example, face down upon a flat surface. In addition, the eyeglasses are adapted for convenient wearing in conjunction with conventional eyeglasses. In this regard, support pins are mounted on the bows to project in inboard directions behind the rear panel of the front frame. These support pins are adjustable in vertical position to rest upon the bows of conventional eyeglasses thereby supporting the binocular eyeglasses in a secure and stable manner. Adjustable ear pieces on the bows may also be provided.

Additional features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
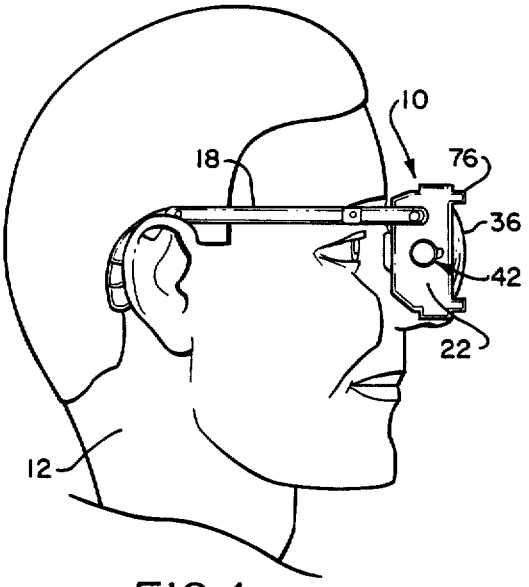
FIG. 1 is a side elevation view depicting use of binocular eyeglasses embodying the novel features of the invention.
Figure 2:
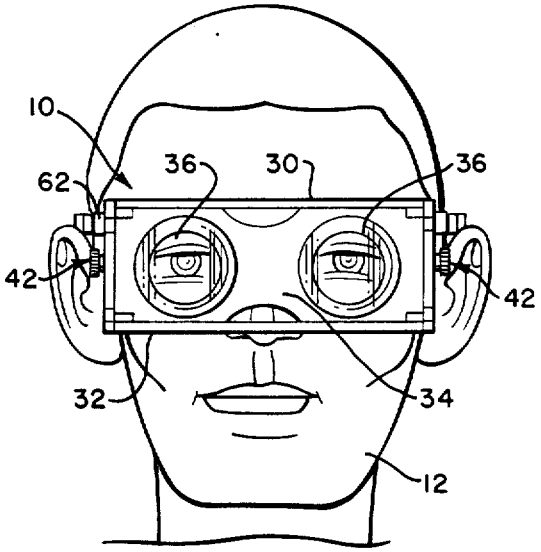
FIG. 2 is a front elevation view depicting use of the binocular eyeglasses.

As shown in the exemplary drawings, a pair of binocular eyeglasses is referred to generally by the reference numeral 10. The binocular eyeglasses are adapted for comfortable wearing by a viewer 12 and include optical elements for magnification or enlargement of observed images. The optical elements are adjustable between a relatively close-range focus setting for use, for example, while watching television or the like and a long-range focus setting for observing distant images, such as a sporting event or theatrical production or the like.

The binocular eyeglasses 10 of the present invention are adapted for construction predominantly from relatively lightweight and inexpensive materials, such as molded plastic or the like, to accommodate comfortable wearing by the viewer 12 over an extended period of time. The optical elements are selected to maintain the size of the eyeglasses in a relatively compact form, thereby avoiding undue weight and/or significant nonuniformity of weight distribution when the eyeglasses are worn. In addition, the binocular eyeglasses 10 are compatible with and may be worn in a secure and stable manner directly over conventional eyeglasses 14 (FIG. 3), such as prescription eyeglasses, sunglasses, or the like. Accordingly, the eyeglasses 10 permit the viewer to observe enlarged or magnified images on a continuous basis thereby avoiding repetitious manual placement of traditional binoculars or the like in front of the viewer's eyes.

As shown best in FIGS. 3–7, the binocular eyeglasses 10 of the present invention comprise an eyeglass frame assembly including a lens-carrying front frame 16 and a pair of rearwardly projecting bows 18. More particularly, the front frame 16 includes a generally U-shaped and forwardly open frame member having a transversely extending rear panel 20 joined at its opposite ends to a pair of forwardly projecting side panels 22. The rear panel 20 has a pair of lens openings 24 formed therein, with a respective pair of eyepiece lenses 26 being securely mounted within the lens openings 24. In the preferred form, these eyepiece lenses 26 are constructed from a lightweight and relatively inexpensive transparent plastic material and are secured within the lens openings by a suitable adhesive material, with the U-shaped frame member also being formed from a lightweight plastic material. A central region of the rear panel 20 is shaped with a downwardly open notch 28 for seated reception upon the nose bridge of the viewer 12, in a manner known with conventional eyeglasses.

Figure 3:
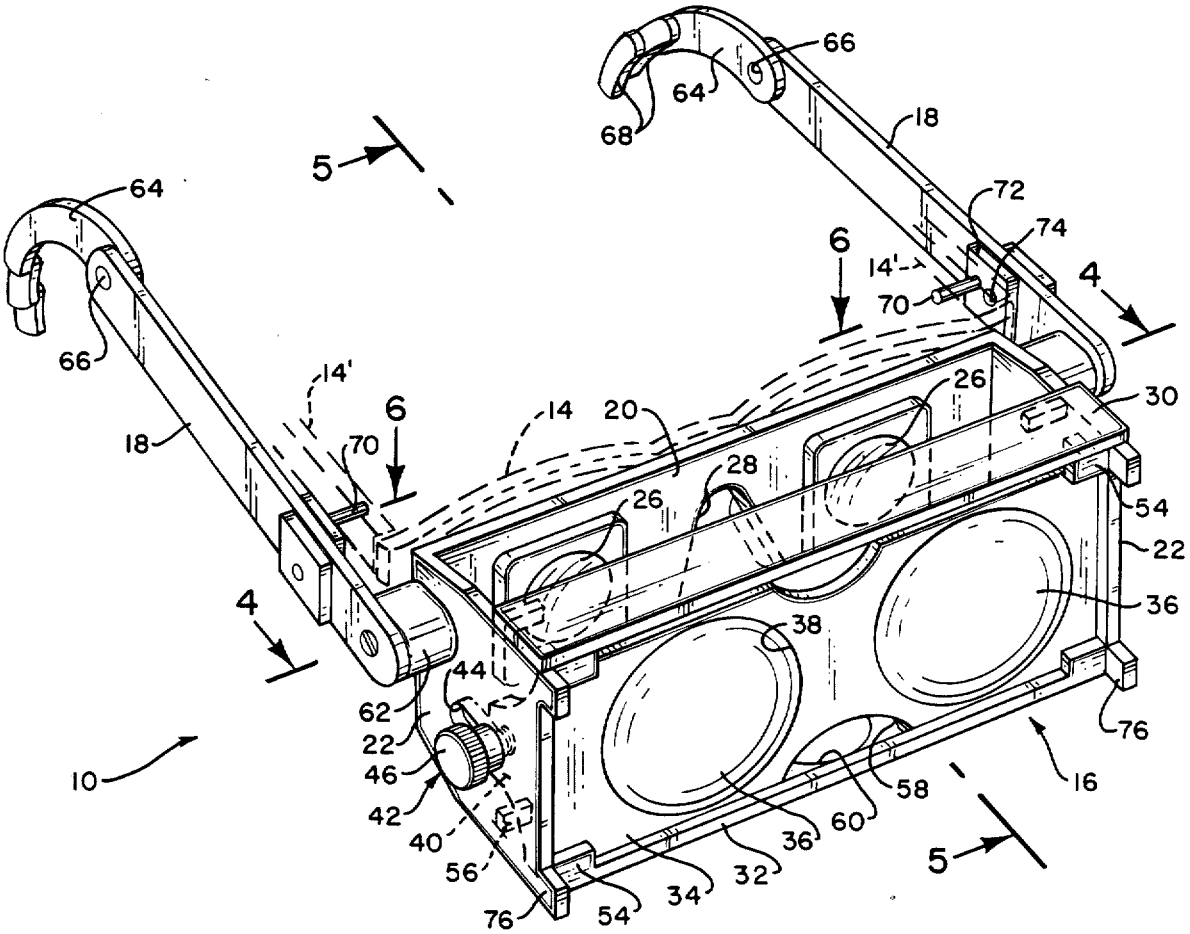
FIG. 3 is an enlarged perspective view illustrating the binocular eyeglasses.
Figure 4:
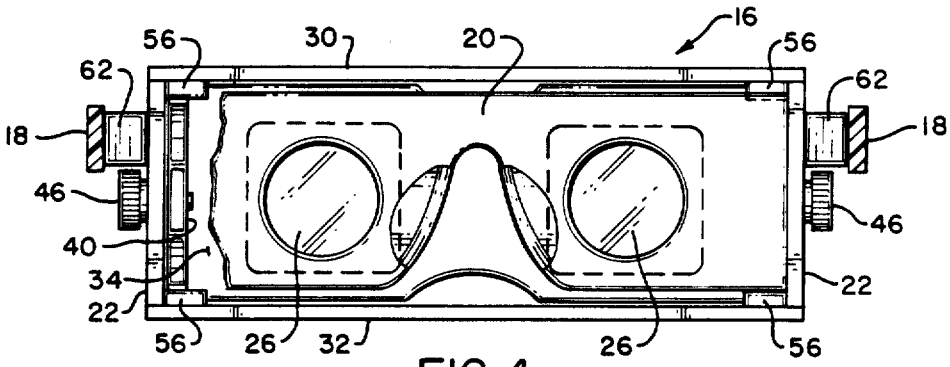
FIG. 4 is a transverse vertical sectional view taken generally on the line 4—4 of FIG. 3, with portions broken away to illustrate construction details of the eyeglasses.

The side panels 22 of the front frame 16 are interconnected near their forward ends by upper and lower cross bars 30 and 32, as shown best in FIG. 3. The side panels 22 thus cooperate with the cross bars 30 and 32 to define a generally rectangular hollow frame or track structure disposed in front of the rear panel 20 and associated eyepiece lenses 26. A front slide panel 34 is movably mounted within this frame structure and carries a respective pair of objective lenses 36 in transversely spaced positions aligned on respective optical axes with the eyepiece lenses 26. Conveniently, these objective lenses 36 are also formed from a lightweight plastic material or the like and adapted for simplified mounting by use of an adhesive or the like into lens openings 38 of the slide panel 34 which is also desirably constructed from a lightweight plastic material.

The front slide panel 34 includes rearwardly protruding side wings 40 positioned inboard with respect to the frame side panels 22 for confining the slide panel 34 therebetween for fore-aft sliding movement. In this regard, lock screws 42 are threaded into these side wings 40 and protrude outwardly in opposite lateral directions through elongated slots 44 in the side panels 22 which accommodate sliding movement of the slide panel 34 and its objective lenses 36 in the fore-aft direction. The outboard ends of these lock screws 42 terminate in enlarged knobs 46 for easy manual grasping, with shoulder stops 48 being provided to bear upon the side panels 22 and lock the slide panel 34 in the selected position of adjustment against fore-aft sliding movement.

In accordance with one aspect of the invention, the front frame 16 include means for insuring accurate positional adjustment of the objective lenses 36 without disrupting uniformity of spacing and coaxial alignment with their respective eyepiece lenses. In particular, the side panel 22 includes forwardly projecting guide runners 50 meshed within mating notched lower corners 52 in the slide panel 34 for vertically supporting the slide panel without misalignment of the objective lenses 36 from their optical axes. In addition, the side panels 22 include a set of front limit stops 54 and rear limit stops 56 for engaging the slide panel 34, thereby defining front and rear end limit positions of slide panel adjustment.

Figure 8:
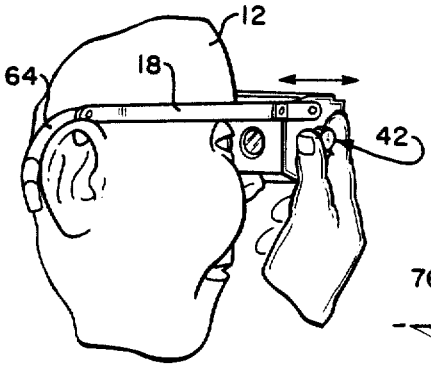
FIG. 8 is a perspective view illustrating adjustment of the eyeglasses in use; [and]

In use, the slide panel 34 and the objective lenses 36 carried thereby can be displaced quickly and easily to a close-range focus setting (FIG. 3) with the slide panel 34 seated against the front limit stops 54, or to an alternative long-range focus setting position with the front panel seated against the rear limit stops 56. This adjustment is achieved, as viewed generally in FIGS. 6 and 8, by loosening the lock screws 42 to permit easy fore-aft sliding movement of the slide panel 34 to the desired focus setting position, followed by retightening of the lock screws 42 to lock the slide panel in place. Arcuate recesses 58 and 60 may be formed in the slide panel 34 and in the lower cross bar 32, respectively, to accommodate the nose of a viewer without interference, as required.

In the preferred form of the invention, the object lenses 36 are selected with relatively wide-angle and low-power magnification characteristics, such as an approximate 2× power, thereby permitting relatively close spacing between the eyepiece and objective lenses. With this construction, the fore-aft depth of the eyeglasses is minimized for correspondingly minimizing the weight and loading of the eyeglasses upon the viewer. With such lenses, a fore-aft adjustment capability of about three-sixteenths inch for the objective lenses will accommodate a close-range focus setting for clear viewing of images at about six to twenty feet, such as while watching television, and a long-range focus setting for clear viewing of images at over about twenty feet, such as during a sporting event or theatrical production of the like.

The bows 18 of the eyeglass frame assembly are mounted to the outboard sides of the side panels 22 by means of spacer elements 62 which position the bows laterally outwardly beyond the bows 14' of conventional eyeglasses. Accordingly, the binocular eyeglasses 10 of the present invention can be worn directly over conventional eyeglasses 14, with rear earpieces 64 on the bows 18 received rearwardly over and behind the viewer's ears. In this regard, the earpieces 64 are desirably adjustable about a horizontal axis with respect to the bows 18 by means of pivot pins 66. Moreover, the earpieces 64 desirably include inboard pads 68 arranged in steps, as viewed in FIG. 3, for contacting the viewer's head at a position behind the ears.

Figure 5:
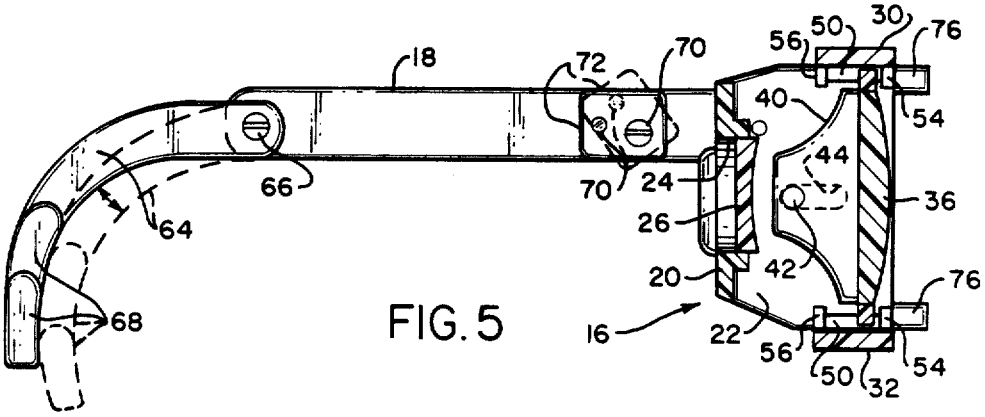
FIG. 5 is a longitudinal vertical sectional view taken generally on the line 5—5 of FIG. 3.
Figure 6:
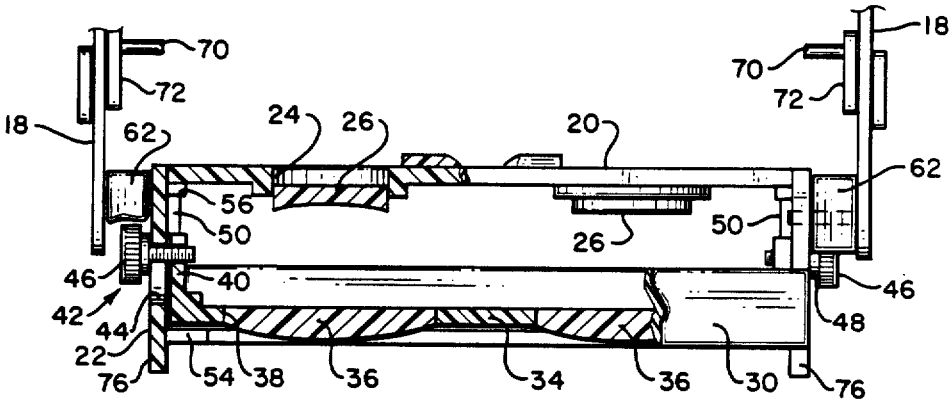
FIG. 6 is a fragmented top plan view of the eyeglasses, with portions broken away to illustrate additional construction details.
Figure 7:
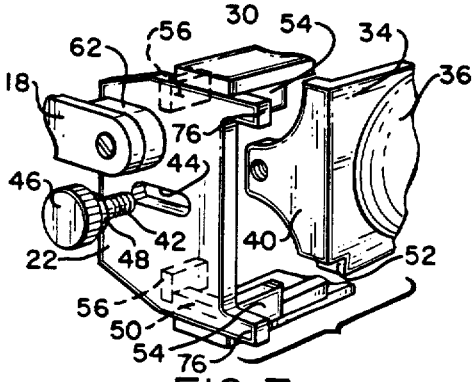
FIG. 7 is a fragmented exploded perspective view illustrating assembly of portions of the eyeglasses.

Support pins 70 are advantageously provided on the bows 18 to assist in supporting the binocular eyeglasses 10 when worn over conventional eyeglasses or the like. These support pins, as shown in FIGS. 3 and 5, are conveniently carried on vertically oriented adjustment plates 72 connected respectively to the inboard sides of the bows 18 by screws 74 of the like at positions near the rear panel 20 of the front frame 16. The plates 72 can be rotated about the screws 74 to vary the vertical positions of the support pins 70, whereupon the screws 74 can be tightened to anchor the support pins in inboard-projecting positions for seating upon the bows 14' of the eyeglasses 14. In this manner, the binocular eyeglasses 10 are adapted for use with a wide range of different eyeglass styles.

Figure 9:
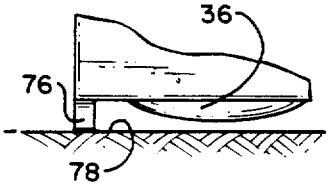
FIG. 9 is a fragmented somewhat diagrammatic view illustrating spacer tabs for protecting objective lenses against scratching[.]; *and*

In accordance with a further feature of the invention, spacer tabs 76 are provided at the front corners of the front frame 16 to protect the objective lenses 36 against inadvertent scratching or other damage when placed, for example, face down upon a flat surface 78, as viewed in FIG. 9. These spacer element are conveniently formed integrally with the side panels 22 and project short distances beyond the forwardmost positions of the objective lenses 36. Accordingly, when the eyeglasses are placed face down on the flat surface 78, the tabs 76 effectively maintain the lenses 36 spaced above the surface to protect these lenses against scratching or the like.

The binocular eyeglasses 10 of the present invention thus provide a relatively simple and relatively lightweight optical device adapted for comfortable wearing by a viewer 12 over an extended period of time. The eyeglasses provide significant magnification or enlargement of observed images for enhanced viewer enjoyment. Moreover, the eyeglasses are adjustable quickly and easily between different focus range settings to accommodate different uses.

Figure 10:
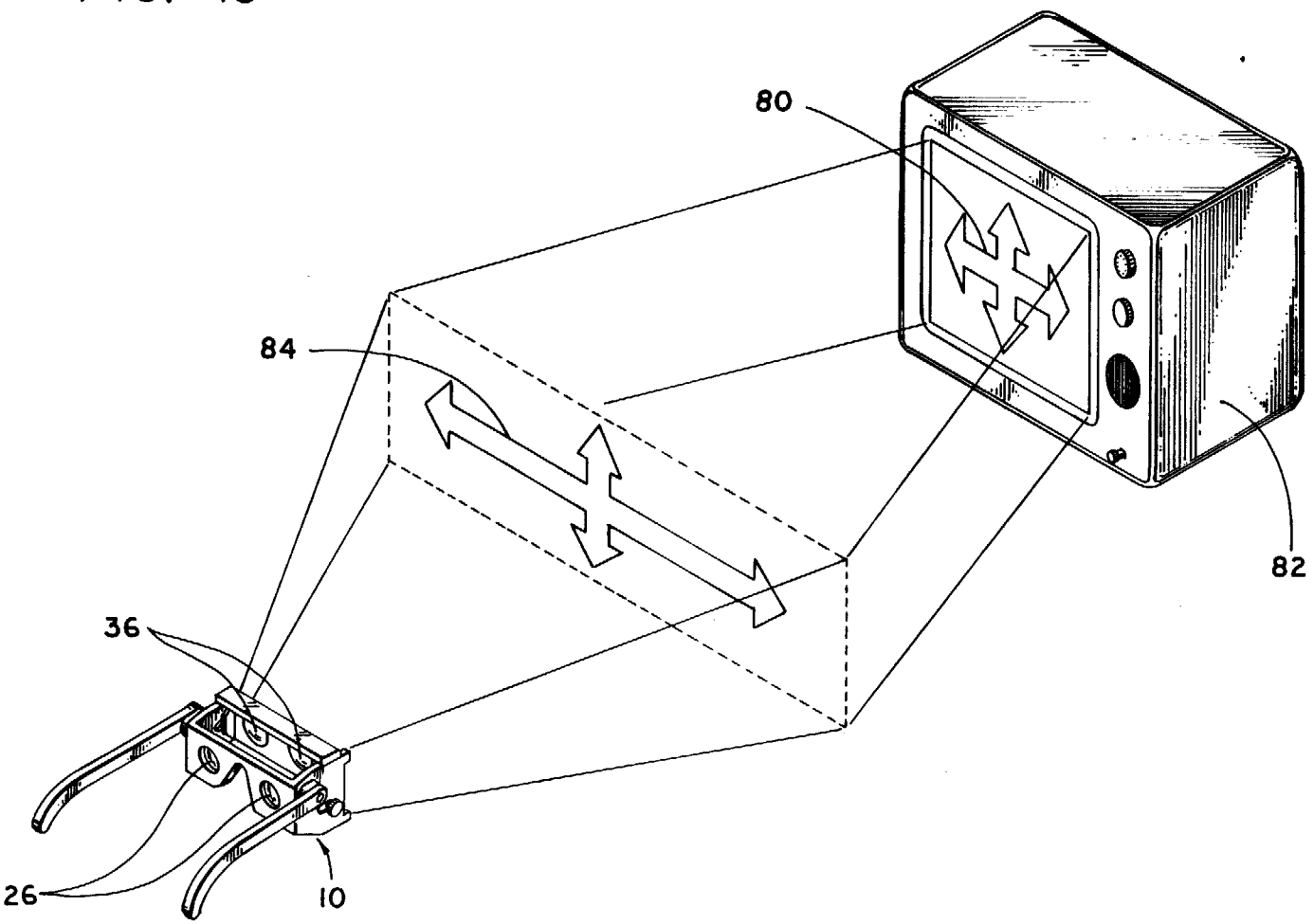
*FIG. 10 is a schematic diagram illustrating one specialized use of the eyeglasses.*

The eyeglasses 10 can be adapted for other specialized uses without significant variation in form or operation. As one example, *as viewed in FIG. 10,* the eyepiece and objective lenses 26 and 36 may comprise so-called anamorphic lenses of equivalent focal lengths for magnifying images in one plane only, such as magnification in the horizontal plane. With such modification, the eyeglasses can be used while [veiwing] *viewing* television images *80* which have been previously reduced in the horizontal plane from a so-called wide screen motion picture production *for broadcast on a standard television 82*. The anamorphic lenses enlarge the images in the horizontal plane to provide the viewer with a wide screen effect *84* without impacting the images in the vertical plane.

Other features and advantages are also believed to be apparent to those skilled in the art. Accordingly, no limitation on the invention is intended by way of the description and drawings herein, except as set forth in the appended claims.

What is claimed is:

1. Binocular eyeglasses, comprising:

a rear frame panel having a pair of lens openings formed therein;

a pair of eyepiece lenses respectively covering said rear panel lens openings;

a pair of slide panels projecting forwardly from opposite ends of said rear panel;

means cooperating with said side panels to define a slide track extending in a fore-aft direction in front of said rear panel;

a front side panel having a pair of lens openings formed therein and received within said track for fore-aft sliding movement relative to said rear panel;

a pair of objective lenses covering said front panel lens openings, said track including means for maintaining said objective lenses in optical alignment with said eyepiece lenses throughout fore-aft sliding movement of said front panel;

means forming front and rear limit stops defining front and rear end limits to fore-aft sliding movement of said front panel;

means for releasably locking said front panel against fore-aft sliding movement; and a pair of bows connected respectively to outboard sides of said side panels and projecting rearwardly therefrom.

2. The binocular eyeglasses of claim 1 wherein said objective lenses comprise relatively wide-angle and relatively low-power magnification lenses.

3. The binocular eyeglasses of claim 2 wherein said eyepiece and objective lenses comprise anamorphic lenses.

4. The binocular eyeglasses of claim 1 wherein said front panel includes a pair of side wings projecting rearwardly at inboard positions respectively adjacent said side panels, said side panels having elongated slots formed therein to extend in the fore-aft direction, and said lock means comprising lock screws secured to said side wings and extending in outboard directions through said slots and terminating at outboard ends in enlarged, manually rotatable knobs.

5. The binocular eyeglasses of claim 1 wherein said alignment maintaining means comprises guide runners extending in the fore-aft direction at the inboard sides of said side panels and received into mating notches formed in said front panel.

6. The binocular eyeglasses of claim 1 further including a plurality of spacer tabs projecting forwardly beyond the forwardmost extent of said objective lenses.

7. The binocular eyeglasses of claim 1 further including a pair of support pins projecting from said bows in inboard directions from positions spaced rearwardly a short distance from said front panel, said support pins being for engaging the bows of conventional eyeglasses worn by a viewer to support the binocular eyeglasses from the conventional eyeglasses.

8. The binocular eyeglasses of claim 1 further including spacer means for spacing said bows in outboard directions relative to said side panels.

9. The binocular eyeglasses of claim 1 further including earpieces at the rear ends of said bows, said earpieces including a plurality of pads at stepped positions in an inboard direction for contacting the head of a viewer behind the viewer's ears.

10. The binocular eyeglasses of claim 2 wherein said objective lenses have a magnification power on the order of 2× and are supported for a fore-aft sliding displacement of about three-sixteenths inch.

*11. A system for broadcasting and viewing television images, comprising:*

*image means for displaying an image for viewing, wherein the image displayed by said image means comprises an image reduced from the normal state in the horizontal plane; and*

*binocular eyeglasses for use in viewing the displayed image, said eyeglasses comprising a frame including means for supporting a pair of anamorphic eyepiece lenses and further including means for supporting a pair of anamorphic objective lenses in respective optical alignment with said eyepiece lenses, said anamorphic eyepiece and objective lenses being oriented for magnifying the image in the horizontal plane when said image is viewed through said lenses.*

*12. The system of claim 11 wherein the image means is a television.*

* * * * *